(12) United States Patent
Yanari (10) Patent No.: US 6,377,399 B1
(45) Date of Patent: *Apr. 23, 2002

(54) IMAGE STABILIZING OPTICAL SYSTEM

(75) Inventor: Mitsuhiro Yanari, Ichikawa (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,276

(22) Filed: Nov. 6, 1997

(30) Foreign Application Priority Data

Nov. 6, 1996 (JP) .............................. 8-311468
Sep. 17, 1997 (JP) .............................. 9-272115

(51) Int. Cl.[7] .............................. G02B 27/64
(52) U.S. Cl. .................. 359/557; 359/407; 359/554
(58) Field of Search .................. 359/362, 420–423, 359/431–433, 676–678, 691–692, 793, 795; 396/52–55, 373–386; 348/208

(56) References Cited

U.S. PATENT DOCUMENTS 4,844,602 A * 7/1989 Kitagishi et al. ........... 359/557
4,974,950 A * 12/1990 Yamazaki et al. .......... 359/557
5,071,235 A * 12/1991 Mori et al. ................. 359/795
5,541,773 A * 7/1996 Kamo et al. ............... 359/692
5,598,299 A * 1/1997 Hayakawa ................. 359/557

FOREIGN PATENT DOCUMENTS

JP          61-156019     *  7/1986     ................. 359/431

* cited by examiner

Primary Examiner—Thong Nguyen
(74) Attorney, Agent, or Firm—Chapman and Cutler (57) ABSTRACT

An image stabilizing optical system having both a simple configuration and high optical performance can be used as an optical system for observation such as a telescope or a binocular. The image stabilizing optical system consists of a first lens group having positive refractive power, a second lens group having negative refractive power and disposed movably in a direction substantially perpendicular to the optical axis, and an erecting prism system, all of which are arranged in order from an object. The optical system includes an objective lens system for forming an erected image at a position on the eye-side of the erecting prism system and an eyepiece lens system having positive refractive power as a whole and magnifying the erected image so as to allow the magnified erected image to be observed. The first lens group includes at least one positive lens and one negative lens.

3 Claims, 8 Drawing Sheets

IMAGE STABILIZING OPTICAL SYSTEM

BACKGROUND OF THE INVENTION

1. Field of the Invention

The present invention generally relates to an optical system for observation, such as a telescope or a binocular. In particular, the present invention relates to an image stabilizing optical system in which a decentering optical system capable of decentering from the optical axis of the optical system is disposed and which can compensate for waver of an image, due to vibration produced for reasons such as movement of hands, by decentering the decentering optical system so as to deflect the image when the optical system vibrates.

2. Description of Related Art

An observation optical system such as a binocular having a waver compensator has been disclosed in, for example, Japanese Laid-Open Patent Publication No. 55-98718. The waver compensator disclosed in this publication spatially stabilizes a prism suspended by gimbals in the optical system by using a gyro-motor so as to stabilize an image.

Other optical systems having waver compensators have been disclosed in, for example, Japanese Laid-Open Patent Publications 2-271316 and 7-43646. The optical system disclosed in the former publication stabilizes the image by moving an erecting optical system with a supporting mechanism known as a cardan shaft. On the other hand, the optical system disclosed in the latter publication deflects the optical axis by deforming a variable angle prism so as to stabilize the image.

An image stabilizing optical system having a waver compensator utilizing a decentering optical system has been put to practical use in a camera lens which serves as a photographing optical system.

When movement of an erecting optical system is used to provide the waver compensation, a complicated large-sized device such as a gyro-motor, gimbals or the cardan shaft is required, resulting in an increase in size of the optical instrument. Therefore, the optical instrument incorporating such an erecting optical system cannot be adequately reduced in size.

In an image stabilizing optical system using the variable apex angle prism, when attempting to compensate for the waver of the image by the variable apex angle prism, lateral chromatic aberration by decentering increases. This degrades the image quality. However, it is very difficult to compensate for the chromatic aberration of magnification by decentering while simplifying the structure of the optical system.

On the other hand, a compensator for the chromatic aberration of magnification by decentering has been used. This compensator can satisfactorily correct the chromatic aberration of magnification by decentering during the waver compensation by appropriately selecting a material for the erecting prism or the variable apex angle prism. However, a practical material for the variable apex angle prism is extremely limited. This makes it difficult to correct the chromatic aberration of magnification by decentering in optical systems having various specifications when compensating for the waver and yet correct various types of chromatic aberration satisfactorily when the waver compensation is not performed.

Moreover, an image stabilizing optical system having a decentering optical system has been put to practical use in connection with a camera lens. However, the configuration of such an image stabilizing optical system for photography is complicated. Such a configuration is not suitable for applications to optical systems for observation such as telescopes and binoculars, which require relatively simple configurations. Therefore, there has been no proposal of an image stabilizing optical system for observation systems, such as a telescope or a binocular, which includes a waver compensator utilizing the decentering optical system and which has simple configuration and high optical performance.

SUMMARY OF THE INVENTION

It is an object of the present invention to provide an image stabilizing optical system for observation, such as a telescope or a binocular, in which a decentering optical system which can be shifted or tilted in a direction substantially perpendicular to an optical axis is disposed so as to deflect an image. Waver of an image due to the movement of hands or the vibration in a car as it is driven can be compensated for with a simple system configuration and high optical performance.

In order to achieve the above object, according to an aspect of the present invention, an image stabilizing optical system includes, in order from an object-side, an objective lens system including a first lens group having positive refractive power, a second lens group having negative refractive power, and an erecting prism system. An eyepiece lens system is used for magnifying an erected image formed on an eye-side of the erecting prism system by the objective lens system so as to allow the magnified erected image to be observed. The eyepiece lens system has a positive refractive power as a whole. In the image stabilizing optical system, the first lens group includes at least one positive lens and one negative lens. The second lens group is moved in a direction substantially perpendicular to an optical axis, thereby deviating the image so as to stabilize the image.

In the present invention, the second lens group is moved in the direction substantially perpendicular to the optical axis when vibration occurs due to movement of the hands or the like, so as to produce deviation of the image in a direction which cancels out the deviation of the image due to the vibration. A stabilized image is thereby obtained. In addition, the erecting prism system is disposed on the eye side of the second lens group in the present invention. This allows the erected image to be formed on the eye-side of the erecting prism system. Moreover, in the present invention, the eyepiece lens system for magnifying the erected image so that the magnified erected image can be observed is disposed at a position on the eye-side of the erecting prism system so that the optical system is useable as an afocal optical system such as the binocular optical system.

DESCRIPTION OF THE PREFERRED EMBODIMENT

The preferred embodiments of the present invention will be explained below. FIGS. 1, 3, 5 and 7 illustrate first through fourth embodiments of the image stabilizing optical system of the present invention, respectively. In each embodiment, the optical system consists of an objective lens system and an eyepiece lens system EP arranged in that order from an object. The objective lens system includes a first lens group $L_1$ having positive refractive power, a second lens group $L_2$ having negative refractive power and an erecting prism system RP.

The first lens group $L_1$ includes at least one positive lens and one negative lens. The second lens group $L_2$ is disposed to be movable in a direction perpendicular to an optical axis thereof, and is arranged to correct the position of the image by being decentered when the vibration occurs. Moreover, the second lens group $L_2$ is composed of a single lens in the first embodiment, while the second lens group $L_2$ is composed of a lens formed by making lens elements adhering to each other (a cemented lens) in each of the second, third and fourth embodiments.

The eyepiece lens system EP has positive refractive power. The eyepiece lens system EP serves to magnify the erected image formed on an imaging plane I, which is located on the eye-side of the erecting prism system RP, by the objective lens system so that the erected image can be observed while being magnified.

The configuration of the eyepiece lens system in the present invention is not limited to the specific configuration of embodiments to be described, but can vary with the specification of the optical system. For example, the eyepiece lens system can be configured so as to include a negative lens group, an aperture stop and a positive lens group which are arranged in that order from the object-side.

In this configuration, the focal length of the eyepiece lens system can be made shorter, although the configuration becomes complicated. Also, as the field of view gets wider, the eye relief gets longer and satisfactorily corrected aberration can be obtained. Therefore, such a configuration is suitable for a telescope with a high magnification ratio.

In the present invention, it is preferable to satisfy the following expressions:

$$0.25 \leq f_1/f \leq 0.75 \quad (1)$$

$$0.05 \leq D/f \leq 0.6 \quad (2)$$

$$0.2 \leq D/f_1 \leq 0.8 \quad (3)$$

where f is the focal length of the whole objective lens system, $f_1$ is the focal length of the first lens group of the objective lens system and D is the distance between a principle point of the first lens group and a principle point of the second lens group of the objective lens system.

Expression (1) defines a ratio of the focal length f of the whole objective lens system and the focal length $f_1$ of the first lens group.

When a value of $f_1/f$ is reduced, a ratio of the deviation amount of the image to the decentering amount of the second lens group from the optical axis can be made larger. Consequently, the deviation amount of the image can be increased even by a small amount of the movement of the second lens group. Moreover, since the lens diameter of the second lens group, which serves as the compensating lens group, can be reduced by appropriate design, the weight of the second lens group is reduced and, therefore, the charge applied to the waver compensating mechanism can also be reduced. Thus, this is preferable. Furthermore, it is easy to reduce the telephoto ratio, thereby easily shortening the total length of the lens. This is advantageous, due to its excellent compactness, for practical use.

When the value of $f_1/f$ falls below the lower limit of Expression (1), the focal length $f_1$ of the first lens group is too small, with respect to the focal length f of the whole objective lens system, to realize satisfactory correction of aberration. In particular, when the aberration correction in the first lens group is insufficient, various types of aberration when the second lens group is decentering are made significantly worse. Thus, this case is not preferable. On the other hand, when the F-number of the whole objective lens system is small, the F-number of the first lens group is even smaller, so that it is difficult to correct for aberrations and, in particular, for spherical aberrations. In order to compensate for this, a complicated lens arrangement is required, making the optical system excessively large and increasing problems in practical use such as, for example, the problems of weight and cost. Thus, this is not preferable. In particular, when the second lens group serving as the compensating lens group becomes complicated in configuration so as to increase the number of the lenses employed, the weight of the second lens is also increased and, therefore, the charge applied to the waver compensating mechanism becomes larger, causing the waver compensating mechanism to be complicated. Thus, this is not preferable. In an optical system requiring a simple and lightweight configuration such as a telescope and binoculars, as compared with a photographing optical system such as a camera, it is not preferable for the lens to become complicated or excessively large.

On the other hand, when the value of $f_1/f$ is increased, the telephoto ratio cannot be reduced. This results in the disadvantage that the total lens length becomes long. However, the F-number of the first lens group can be made larger in this case, so that it is easy to correct for the aberration. This makes the configuration of the optical system simple and lightweight. In addition, since the ratio of the deviation amount of the image to the decentering amount of the second lens group becomes smaller, the decentering amount of the second lens group required for obtaining the required deviation amount of the image becomes larger, resulting in an increase in the lens diameter of the second lens group and an increase in the size of the waver compensating mechanism. However, in this case, reductions of the fabrication tolerance and the accuracy of lens control are permissible. Therefore, the advantage that the problems of the fabrication are reduced can be obtained.

When the value of $f_1/f$ exceeds the upper limit of Expression (1), since the focal length $f_1$ of the first lens group becomes longer with respect to the focal length f of the whole objective lens system, the correction of aberration is made easier. However, the telephoto ratio becomes excessively large. Thus, this case is not preferable. Moreover, the ratio of the deviation amount of the image to the decentering amount of the second lens group from the optical axis becomes excessively small. Therefore, even if the second lens group is moved by a large amount, the deviation amount of the image obtained is small, so that the decentering amount of the lens becomes too large with respect to the deviation amount of the image. In order to provide a predetermined deviation amount of the image, it is necessary to make a movable part of the second lens group larger, making the waver compensating mechanism excessively large. Thus, this is not preferable for practical use.

Expression (2) defines a ratio of the distance D between the principle point of the first lens group and the principle point of the second lens group to the focal length f of the whole objective lens system.

When a value of D/f falls below the lower limit of the Expression (2), the distance between the first and second lens groups becomes too small. Therefore, a possibility that the first lens group and the second lens group will come into contact is generated. In addition, the telephoto ratio becomes larger, which causes the total lens length to be increased, and the second lens group becomes excessively large. Therefore, this it not preferable.

On the other hand, when the value of D/f is increased, the distance from the second lens group to the image plane becomes shorter and, therefore, the prism cannot be made larger. Thus, it becomes difficult to make the field of view wider. However, in this case, the telephoto ratio can be reduced and therefore the total lens length can be shortened easily. Such an optical system has the advantage of excellent compactness.

When the value of D/f exceeds the upper limit of Expression (2), the distance from the second lens group to the image plane becomes excessively short, preventing the prism from being disposed in place. Therefore, this is not preferable.

More preferably, Expression (2) is modified as follows:

$$0.12 \leq D/f \leq 0.55 \tag{2a}$$

Expression (3) defines a ratio of the distance D between the principle point of the first lens group and the principle point of the second lens group to the focal length $f_1$ of the first lens group. Even when Expressions (1) and (2) are satisfied, there are some cases in which the principle point distance D is larger than the focal length $f_1$ of the first lens group. Such cases are not preferable. Therefore, it is necessary to simultaneously satisfy Expressions (1) and (2) as well as Expression (3).

When a value of $D/f_1$ falls below the lower limit of Expression (3), the distance between the first and second lens groups is too small. In some cases, therefore, the first lens group hits the second lens group. The telephoto ratio becomes larger so as to increase the total lens length and, also, the second lens group is caused to become larger. Furthermore, in some cases, the value of D/f included in Expression (2) also falls below the lower limit of Expression (2). These cases are not preferable.

When the value of $D/f_1$ exceeds the upper limit of Expression (3), the distance from the second lens group to the image plane is too short to incorporate the prism. Moreover, in some cases, the value of D/f, which appears in Expression (2), also exceeds the upper limit of Expression (2). These cases are not preferable.

More preferably, Expression (3) is modified as follows:

$$0.3 \leq D/f_1 \leq 0.67 \tag{3a}$$

In addition, in the present invention, it is preferable that the following expression is satisfied.

$$-2.2 \leq f_2/f_1 \leq -0.25 \tag{4}$$

where $f_2$ is the focal length of the second lens group of the objective lens system.

Expression (4) defines a ratio of the focal length of the first lens group to that of the second lens group. By having a value of $f_2/f_1$ approach −1, the Petzval sum approaches zero and, therefore, field curvature can be corrected easily.

When the value of $f_2/f_1$ falls below the lower limit of Expression (4), the Petzval sum is increased so as to increase the field curvature. In addition, the telephoto ratio is also increased, so that the total lens length becomes longer. This is not preferable.

On the other hand, when the value of $f_2/f_1$ exceeds the upper limit of Expression (4), the refractive power of the second lens group becomes stronger, thereby making it difficult to correct the various types of aberration and, in particular, distortion, decentering coma when the waver compensation is performed, and the chromatic aberration of magnification by decentering. Also, the field curvature becomes larger because the Petzval sum becomes larger in the negative direction. For these reasons, this case is not preferable.

More preferably, Expression (4) is modified as follows:

$$-2.0 \leq f_2/f_1 \leq -0.35 \tag{4a}$$

In an observation optical system such as a telescope or binoculars, it is necessary to simplify the configuration of the optical system and to reduce the weight of the optical system. In order to meet with this requirement, the second lens group can be configured using two or three achromatic lenses. Thus, a simple configuration using a small number of lenses can be achieved. This configuration allows the weight of the optical system to be reduced so as to simplify the waver compensating mechanism, while allowing the various types of chromatic aberration and, in particular, the chromatic aberration of magnification and the chromatic aberration of magnification by decentering to be corrected.

When the second lens group is configured using two lenses, it is preferable to satisfy the following expression:

$$15 \leq \nu_{dif} \tag{5}$$

where $\nu_{dif}$ is the difference (absolute value) of the Abbe number of glass material between the two lenses forming the second lens group.

When $\nu_{dif}$ falls below the lower limit of Expression (5), the achromatic effect is reduced and, therefore, the effect provided by the use of the two lenses is also reduced. This is not preferable.

In addition, in order to satisfactorily correct the coma, in particular, the decentering coma during the image stabilizing operation, while correcting the spherical aberration satisfactorily, it is preferable to satisfy the following expression:

$$-5 \leq (n_d - 1) \cdot f_2/R2a \leq 3 \tag{6}$$

where $n_d$ is the refractive index for the d-line of glass material of a lens located closest to the object side in the second lens group, and R2a is a radius of curvature of the lens surface located closest to the object side in the second lens group.

Expression (6) defines a ratio of the refractive power of the lens surface having the radius of curvature R2a closest to the object side in the second lens group to the refractive power of the whole second lens group.

When the refractive power ratio falls below the lower limit of Expression (6), the spherical aberration can be corrected easily. However, the decentering coma during the waver compensation becomes difficult to deal with. This is not preferable.

On the other hand, when the refractive power ratio exceeds the upper limit of Expression (6), while the coma and the decentering coma during the waver compensation can be corrected easily, the correction of the spherical aberration becomes difficult. Thus, this is not preferable.

More preferably, Expression (6) is modified as follows:

$$-3 \leq (n_d-1) \cdot f_2/R_{2a} \leq 1.5 \quad (6a)$$

Alternatively, in the present invention, the second lens group may be configured using a single negative lens. More specifically, if the configurations of the first lens group, the erecting prism system and the eyepiece lens system are set appropriately, then the second lens group can be configured using a negative single lens, and the various types of aberration, in particular the aberration due to the decentering when the waver compensation is performed, can be satisfactorily corrected. Moreover, by having the second lens group formed by a single lens, the compensating lens group can be configured as simple as possible so as to obtain the lightweight optical system and to simplify the waver compensating mechanism. Therefore, this case is advantageous in view of various points.

However, when the second lens group is configured by using the single lens, it is difficult to correct the chromatic aberration, in particular the chromatic aberration of magnification, by decentering during the waver compensation. Therefore, it is necessary to satisfy the following expression (7):

$$40 \leq v_{d2} \quad (7)$$

where $v_{d2}$ is the Abbe number of glass material of a single negative lens included in the second lens group.

Expression (7) defines the Abbe number $v_{d2}$ of the second lens group consisting of the negative single lens.

When a value of $v_{d2}$ falls below the lower limit of Expression (7), color dispersion by the second lens group becomes larger, so that the chromatic aberration of magnification, in particular the chromatic aberration of magnification due to the decentering, becomes too large. Thus, this is not preferable.

More preferably, Expression (7) is modified as follows:

$$50 \leq v_{d2} \quad (7a)$$

Values for various items in the first through fourth embodiments are listed in the following Tables 1–4, respectively. In a portion of each table showing various values for items of lens, the first column "No" shows the number of each lens surface counted from the object-side, the second column "R" shows the radius of curvature of each lens surface, the third column "d" shows the distance along the optical axis of each lens surface from the preceding lens surface, the fourth column "$n_d$" shows a refractive index for the d-line of each lens, and the fifth column "$v_d$" shows the Abbe number of each lens with respect to the d-line. In all tables, distances, lengths and so on are in mm unless otherwise specified.

Moreover, values corresponding to the above-mentioned expressions for the respective embodiments are listed in Table 5.

TABLE 1

(Various values for main items)
f = 260.0   $f_{1\ =\ 104.0}$   $f_2$ = −67.5   D = 63.5
Field number = 15.9   Objective $F_{no}$ = 6.5
(Various values for items of lens)

| No | R | d | $n_d$ | $v_d$ |
|---|---|---|---|---|
| 1 | 207.97 | 5.5 | 1.51680 | 64.10 |
| 2 | −77.03 | 1.5 | 1.75692 | 31.62 |
| 3 | −240.78 | 0.2 | | |
| 4 | 69.09 | 4.5 | 1.51680 | 64.10 |
| 5 | 1602.18 | 58.8 | | |
| 6 | 871.22 | 1.0 | 1.51680 | 64.10 |
| 7 | 33.53 | 40.0 | | |
| 8 | ∞ | 35.0 | 1.56883 | 56.05 |
| 9 | ∞ | 1.4 | | |
| 10 | ∞ | 35.0 | 1.56833 | 56.05 |
| 11 | ∞ | 24.6 | | |
| 12 | −63.15 | 1.0 | 1.80458 | 25.50 |
| 13 | 44.75 | 4.5 | 1.62041 | 60.14 |
| 14 | −25.09 | 0.2 | | |
| 15 | 24.89 | 1.0 | 1.80458 | 25.50 |
| 16 | 12.81 | 6.5 | 1.58913 | 61.09 |
| 17 | −274.75 | 0.2 | | |
| 18 | 15.69 | 4.0 | 1.58913 | 61.09 |
| 19 | 594.75 | | | |

TABLE 2

(Various values for main items)
f = 260.0   $f_{1\ =\ 104.0}$   $f_2$ = −67.5   D = 63.5
Field number = 15.9   Objective $F_{no}$ = 6.5
(Various values for items of lens)

| No | R | d | $n_d$ | $v_d$ |
|---|---|---|---|---|
| 1 | 198.97 | 5.5 | 1.51680 | 64.10 |
| 2 | −68.70 | 1.5 | 1.75692 | 31.62 |
| 3 | −246.22 | 0.2 | | |
| 4 | 75.52 | 4.5 | 1.51680 | 64.10 |
| 5 | −763.94 | 56.8 | | |
| 6 | 249.25 | 1.0 | 1.51680 | 64.10 |
| 7 | 20.28 | 2.0 | 1.74950 | 35.19 |
| 8 | 26.00 | 40.0 | | |
| 9 | ∞ | 37.0 | 1.56883 | 56.05 |
| 10 | ∞ | 1.4 | | |
| 11 | ∞ | 37.0 | 1.56833 | 56.05 |
| 12 | ∞ | 24.3 | | |
| 13 | 975.77 | 1.0 | 1.80458 | 25.50 |
| 14 | 40.63 | 3.5 | 1.56384 | 60.69 |
| 15 | −40.23 | 0.2 | | |
| 16 | 32.25 | 1.0 | 1.80458 | 25.50 |
| 17 | 14.39 | 5.5 | 1.62041 | 60.14 |
| 18 | −74.62 | 0.2 | | |
| 19 | 15.91 | 3.5 | 1.62041 | 60.14 |
| 20 | 149.83 | | | |

TABLE 3

(Various values for main items)
f = 260.0   $f_{1\ =\ 156.0}$   $f_2$ = −140.0   D = 100.0
Field number = 15.9   Objective $F_{no}$ = 6.5
(Various values for items of lens)

| No | R | d | $n_d$ | $v_d$ |
|---|---|---|---|---|
| 1 | 239.36 | 4.0 | 1.51680 | 64.10 |
| 2 | −136.65 | 1.5 | 1.80458 | 25.50 |

TABLE 3-continued

| | | | | |
|---|---|---|---|---|
| 3 | −361.49 | 0.2 | | |
| 4 | 100.81 | 3.0 | 1.51680 | 64.10 |
| 5 | 525.72 | 93.5 | | |
| 6 | 105.40 | 2.0 | 1.60342 | 38.03 |
| 7 | −185.66 | 1.0 | 1.71300 | 53.93 |
| 8 | 57.46 | 30.0 | | |
| 9 | ∞ | 37.0 | 1.56883 | 56.05 |
| 10 | ∞ | 1.4 | | |
| 11 | ∞ | 37.0 | 1.56833 | 56.05 |
| 12 | ∞ | 25.5 | | |
| 13 | −58.93 | 1.0 | 1.80458 | 25.50 |
| 14 | 44.75 | 4.5 | 1.58913 | 61.09 |
| 15 | −22.29 | 0.2 | | |
| 16 | 28.43 | 1.0 | 1.80458 | 25.50 |
| 17 | 14.94 | 6.0 | 1.58913 | 61.09 |
| 18 | −188.17 | 0.2 | | |
| 19 | 17.58 | 4.0 | 1.62041 | 60.14 |
| 20 | −506.66 | | | |

TABLE 4

(Various values for main items)
f = 200.0    $f_1$ = 130.0    $f_2$ = −257.1    D = 40.0
Field number = 16.1    Objective $F_{no}$ = 6.5
(Various values for items of lens)

| No | R | d | $n_d$ | $v_d$ |
|---|---|---|---|---|
| 1 | 221.66 | 3.5 | 1.51680 | 64.10 |
| 2 | −119.45 | 1.5 | 1.80458 | 25.50 |
| 3 | −294.07 | 0.2 | | |
| 4 | 87.72 | 2.5 | 1.51680 | 64.10 |
| 5 | 616.69 | 34.1 | | |
| 6 | 193.59 | 2.0 | 1.60342 | 38.03 |
| 7 | −341.01 | 1.0 | 1.71300 | 53.93 |
| 8 | 106.06 | 40.0 | | |
| 9 | ∞ | 46.0 | 1.56883 | 56.05 |
| 10 | ∞ | 1.4 | | |
| 11 | ∞ | 46.0 | 1.56833 | 56.05 |
| 12 | ∞ | 49.4 | | |
| 13 | −85.40 | 1.0 | 1.80458 | 25.50 |
| 14 | 40.00 | 4.5 | 1.58913 | 61.09 |
| 15 | −25.80 | 0.2 | | |
| 16 | 31.70 | 1.0 | 1.80458 | 25.50 |
| 17 | 17.53 | 5.5 | 1.51680 | 64.10 |
| 18 | −61.18 | 0.2 | | |
| 19 | 18.36 | 4.0 | 1.62041 | 60.14 |
| 20 | −520.00 | | | |

TABLE 5

| | The number of embodiment | 1 | 2 | 3 | 4 |
|---|---|---|---|---|---|
| (1) | $f_1/f$ | 0.40 | 0.40 | 0.60 | 0.65 |
| (2) | (2a) D/f | 0.24 | 0.24 | 0.38 | 0.20 |
| (3) | (3a) D/$f_1$ | 0.61 | 0.61 | 0.64 | 0.31 |
| (4) | (4a) $f_2/f_1$ | −0.65 | −0.65 | −0.90 | 1.98 |
| (5) | $v_{dif}$ | — | 28.91 | 15.90 | 15.90 |
| (6) | (6a) $(n_d − 1) \cdot f_2/R_{2a}$ | −0.04 | −0.14 | −0.80 | −0.80 |
| (7) | (7a) $v_{d2}$ | 64.10 | — | — | — |

Figure 1:
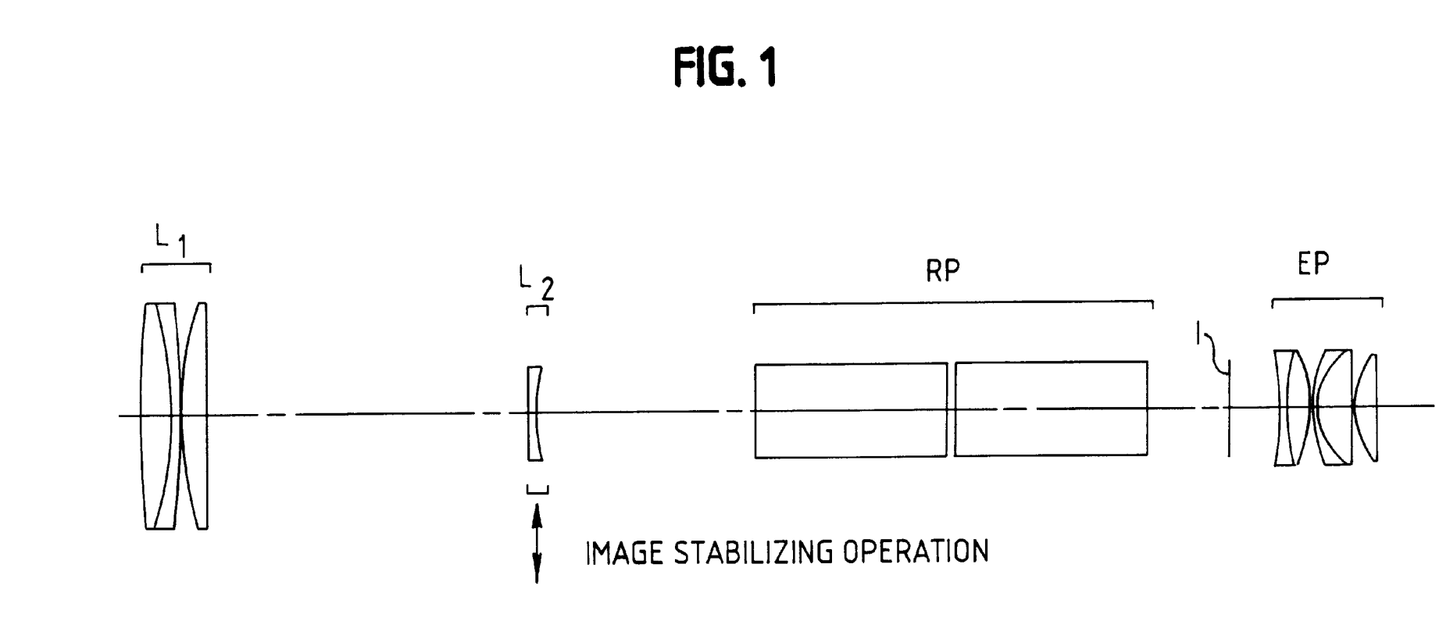
FIG. 1 illustrates a configuration of a first embodiment.
Figure 2A:
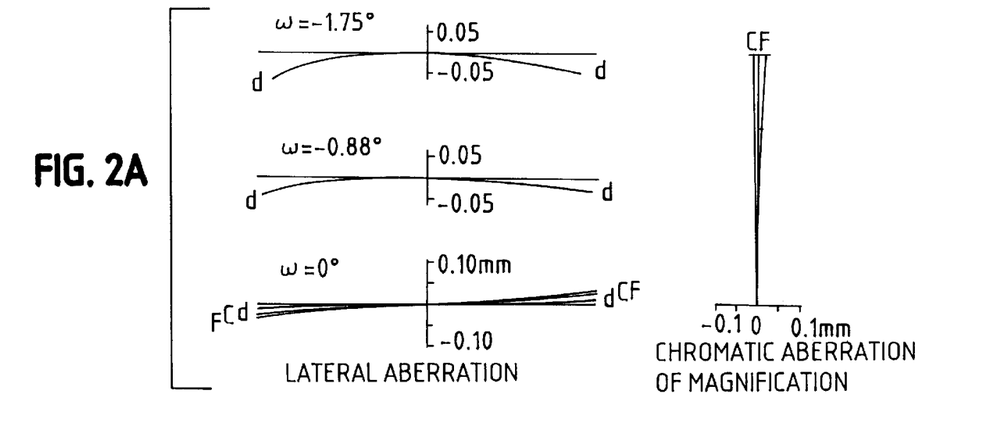
FIG. 2A shows various types of aberration of the objective lens system of the first embodiment when the image stabilizing correction is not performed.
Figure 2B:
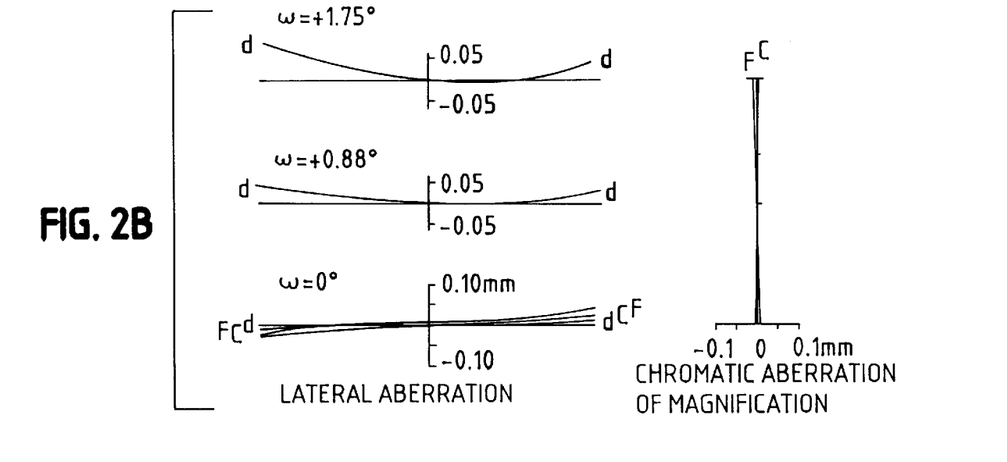
FIGS. 2B and 2C show those when the image stabilizing correction is performed so as to provide a deviation amount of the image of 1 mm.
Figure 2C:
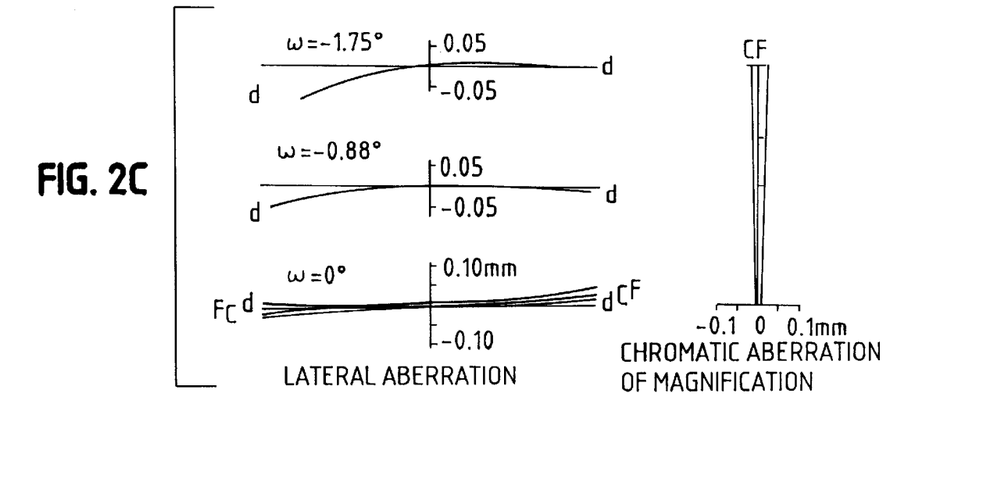
Figure 3:
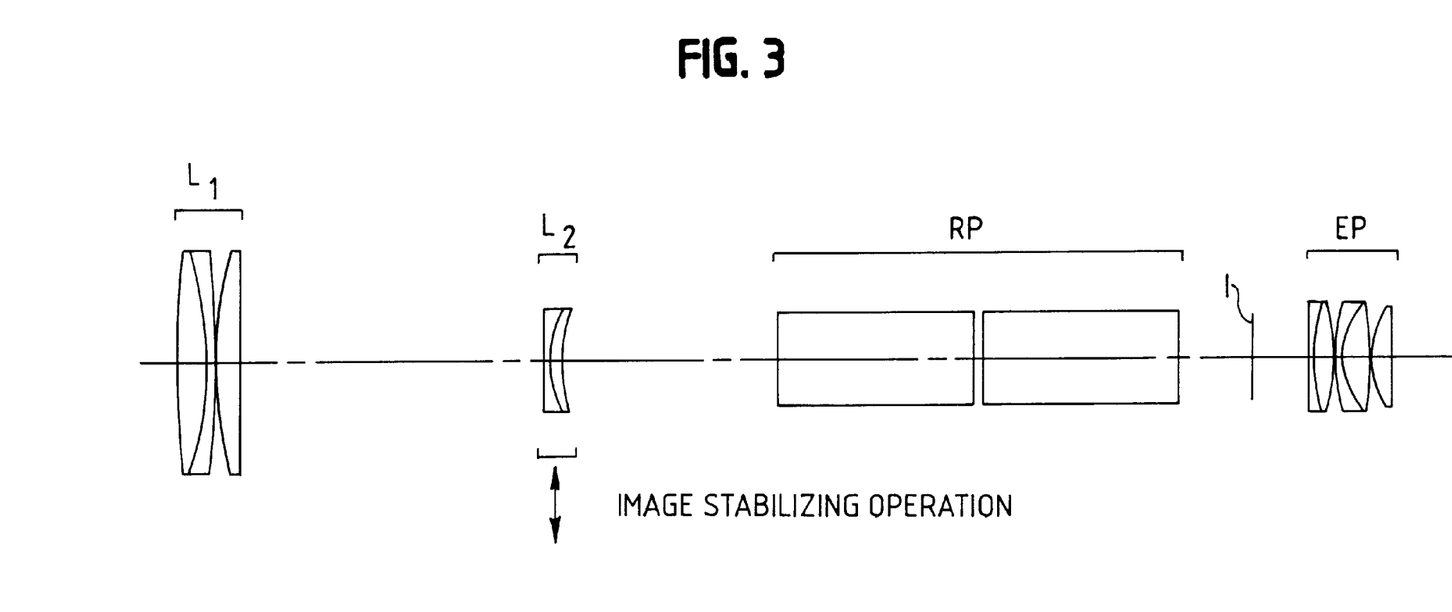
FIG. 3 illustrates a configuration of a second embodiment.
Figure 4A:
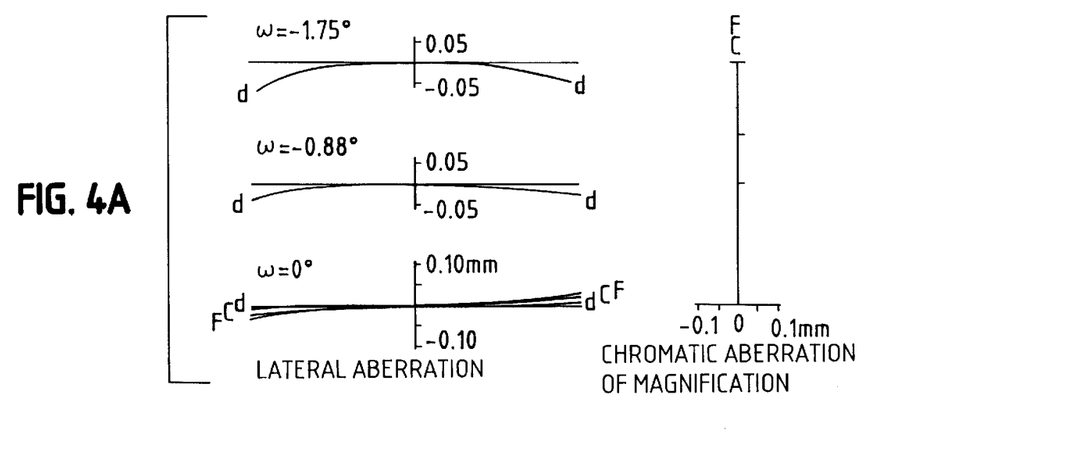
FIG. 4A shows the various types of aberration of the objective lens system of the second embodiment when the image stabilizing correction is not performed.
Figure 4B:
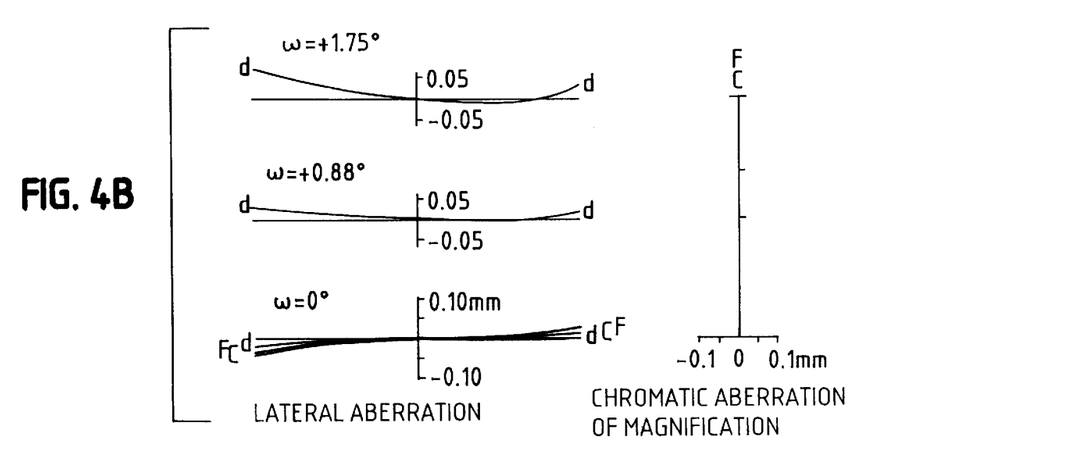
FIGS. 4B and 4C show those when the image stabilizing correction is performed so as to provide the deviation amount of the image of 1 mm.
Figure 4C:
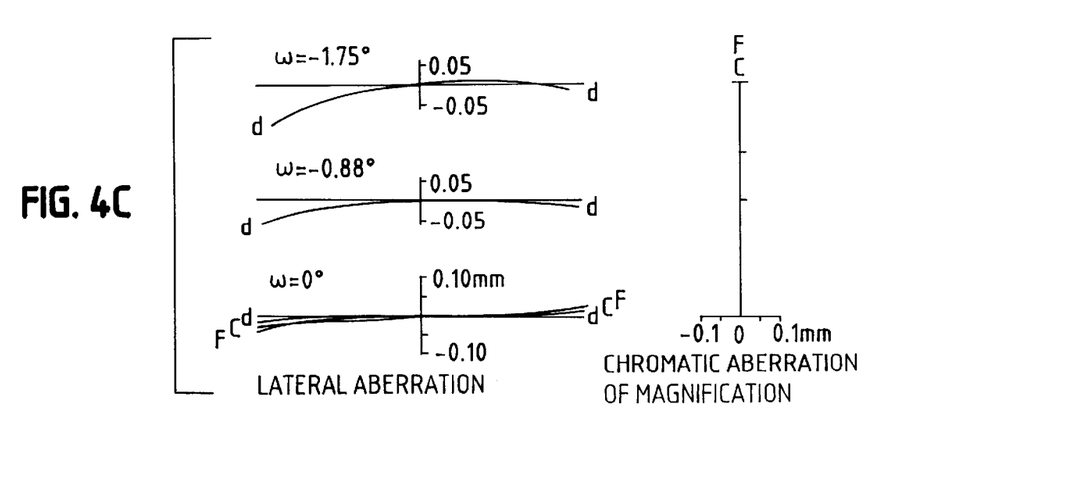
Figure 5:
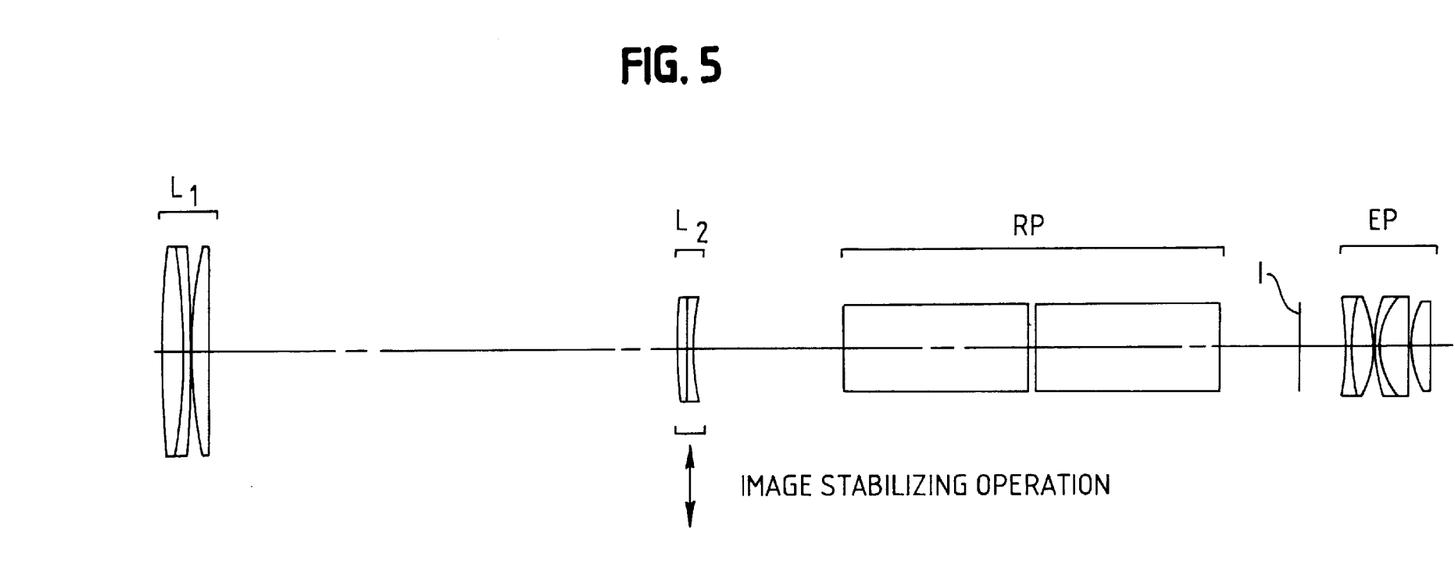
FIG. 5 illustrates a configuration of a third embodiment.
Figure 6A:
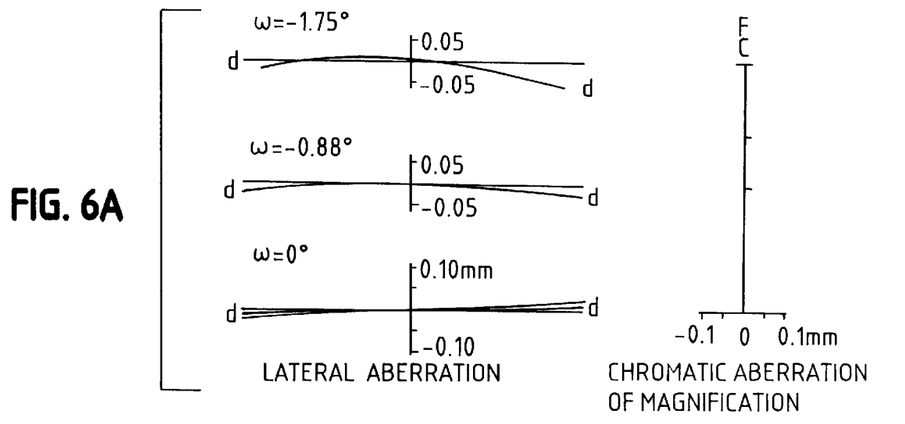
FIG. 6A shows the various types of aberration of the objective lens system of the third embodiment when the image stabilizing correction is not performed.
Figure 6B:
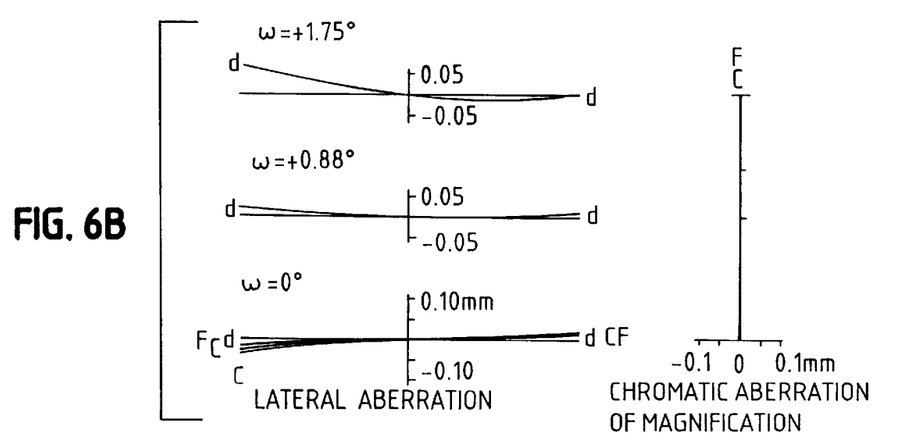
FIGS. 6B and 6C show those when the image stabilizing correction is performed so as to provide the deviation amount of the image of 1 mm.
Figure 6C:
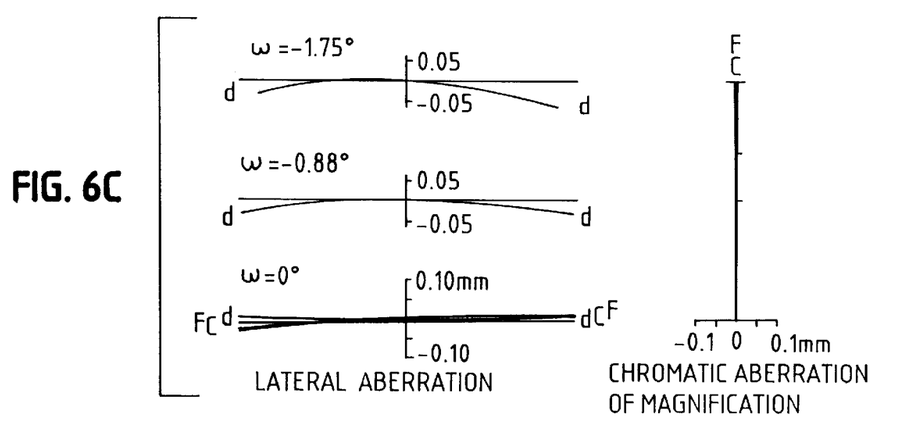
Figure 7:
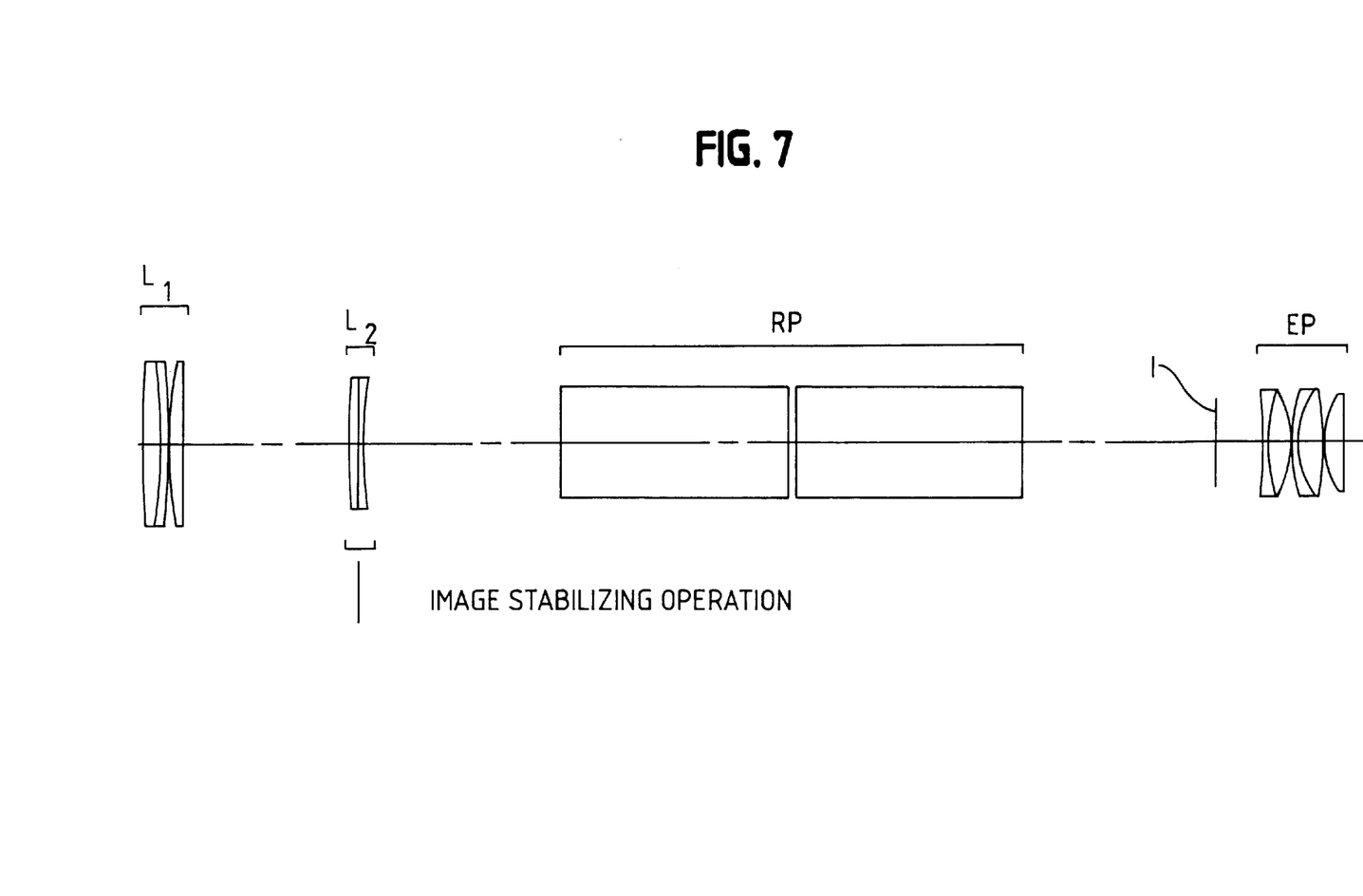
FIG. 7 illustrates a configuration of a fourth embodiment.
Figure 8A:
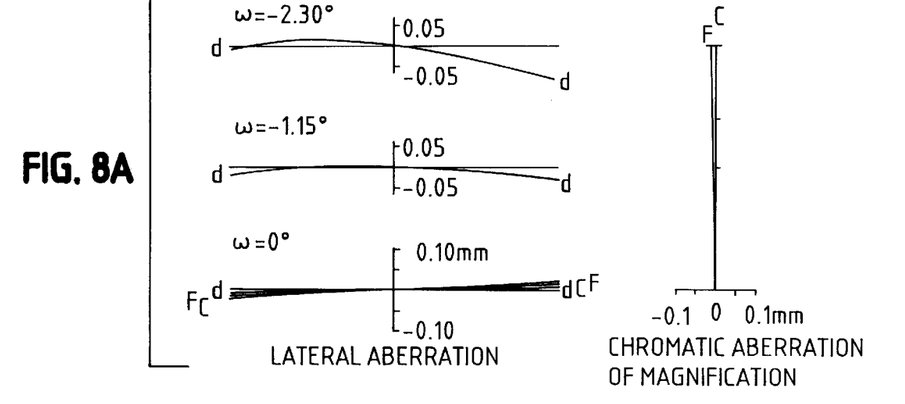
FIG. 8A shows the various types of aberration of the objective lens system of the fourth embodiment when the image stabilizing correction is not performed.
Figure 8B:
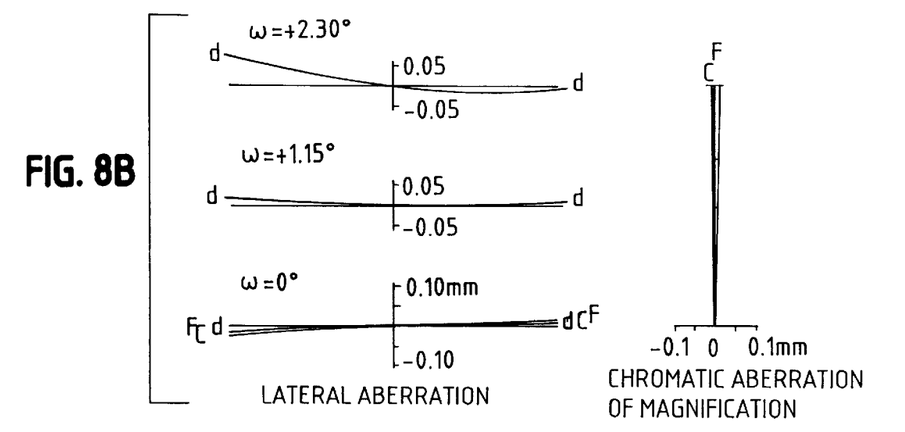
FIGS. 8B and 8C show those when the image stabilizing correction is performed so as to provide the deviation amount of the image of 1 mm.
Figure 8C:
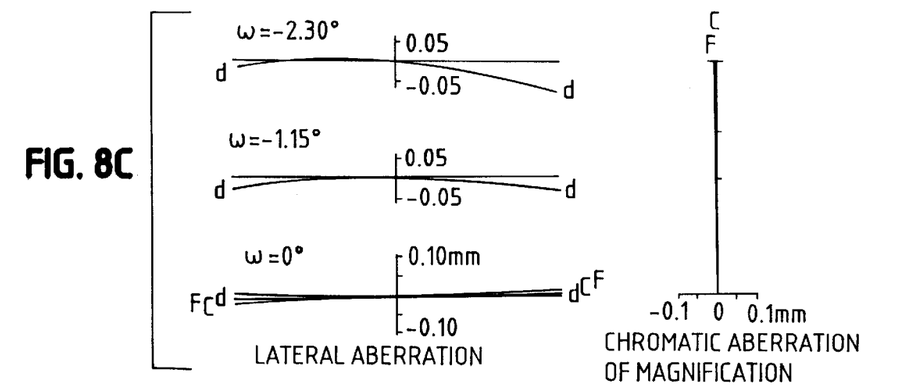

FIGS. 2A to 2C show the lateral aberration and chromatic aberration of magnification of the objective lens system in the first embodiment. FIG. 2A shows the state where the second lens group is disposed in the optical axis and, therefore, the deviation amount of the image is zero. FIGS. 2B and 2C show the state where the second lens group is decentered so as to provide the deviation amount of the image of 1 mm. FIGS. 4A–4C, 6A–6C and 8A–8C show the lateral aberration and the chromatic aberration of magnification in the second, third and fourth embodiments, respectively, in a manner similar to FIGS. 2A–2C. In each diagram showing the aberration, ω represents, in degrees, a half of an angle of view. In each diagram, moreover, d denotes the d-line (λ=587.6 nm), C denotes the c-line (λ=656.3 nm), and F denotes the f-line (λ=486.1 nm).

As is apparent from each aberration diagram, the objective lens system of each embodiment can have a satisfactory imaging performance whether or not the image stabilizing correction is performed.

Although the diagrams mentioned above show the aberration of the objective lens system, it is obvious that other types of aberration including aberration of the eyepiece lens system can be corrected satisfactorily. This is clear from the fact that the various types of aberration of the objective lens system are corrected satisfactorily in both a state in which the decentering occurs and another state in which the decentering does not occur.

The present invention provides an image stabilizing optical system for observation, such as a telescope, in which wavering of the image caused by movement of the hands or vibration occurring in a driving car can be compensated for by a decentering optical system, which can be shifted or tilted in a direction substantially perpendicular to an optical axis so as to deflect the image, so that an image with satisfactory quality can be obtained. Various types of aberration during the waver compensation, in particular, decentering coma and chromatic aberration of magnification by decentering, can be corrected satisfactorily. A simple configuration and a high optical performance are provided. Moreover, a vibration-prof optical system for observation, such as binoculars, with a simple configuration and high optical performance can be obtained by providing a pair of optical systems according to the present invention.

What is claimed is:

1. An image stabilizing optical system for observation comprising in order from an object-side to an eyepiece-side:

an objective lens system including a first lens group having positive refractive power, a second lens group having negative refractive power and an erecting prism system; and an eyepiece lens system, wherein said objective lens system forming an erected image, the erected image being formed on the eyepiece-side of the erecting prism system, said eyepiece lens system magnifying said erected image to be observed and having positive refractive power as a whole, the first lens group includes at least one positive lens and one negative lens, and comprises one composite lens composed of two lenses cemented together and one positive simple lens, in this order from the object side, the second lens group consists of one negative lens and adjoins said erecting prism system from the object-side; and said second lens group is moved in a direction substantially perpendicular to an optical axis, thereby deviating the image so as to stabilize the image, and wherein the following expressions are satisfied:

$0.25 \leq f_1/f \leq 0.75$;

$0.05 \leq D/f \leq 0.6$;

$0.2 \leq D/f_1 \leq 0.8$;

$40 \leq v_{d2}$, and $-2.2 \leq f_2/f_1 \leq -0.25$, where f is a focal length of the objective lens system, $f_1$ is a focal length of the first lens group, $f_2$ is a focal length of the second lens group of the objective lens system, D is a distance between principle points of the first lens group and the second lens group, and $\nu_{d2}$ is the Abbe number for the d-line of the negative lens of the second lens group.

2. An image stabilizing optical system for observation comprising in order from an object-side to an eyepiece-side:

an objective lens system including:

a first lens group having positive refractive power and comprising at least one positive lens and one negative lens, a second lens group having negative refractive power, and an erecting prism system; and an eyepiece lens system having positive refractive power as a whole;

said objective lens system forming an erected image on the eyepiece-side of the erecting prism system, and said eyepiece lens system magnifying said erected image to be observed;

wherein the first lens group includes at least one positive and one negative lens, with one lens being a composite lens composed of two lenses cemented together and one lens being a positive simple lens, in this order from the object side; and the second lens group is composed of cemented lens elements;

said second lens group adjoins said erecting prism system from the object-side with an air gap between said second lens group and said prism system, and said second lens group is moved in a direction substantially perpendicular to an optical axis to deviate the image so as to stabilize the image; and wherein the following expressions are satisfied:

$0.25 \leq f_1/f \leq 0.75$;

$0.05 \leq D/f \leq 0.6$;

and $0.2 \leq D/f_1 \leq 0.8$, where f is a focal length of the objective lens system, $f_1$ is a focal length of the first lens group and D is a distance between principle points of the first lens group and the second lens group.

3. An image stabilizing optical system for observation comprising in order from an object-side to an eyepiece-side:

an objective lens system including:

a first lens group having positive refractive power and comprising at least one positive lens and one negative lens, a second lens group having negative refractive power, and an erecting prism system; and an eyepiece lens system having positive refractive power as a whole;

said objective lens system forming an erected image on the eyepiece-side of the erecting prism system, and said eyepiece lens system magnifying said erected image to be observed;

wherein the first lens group includes at least one positive and one negative lens, with one lens being a composite lens composed of two lenses cemented together and one lens being a positive simple lens, in this order from the object side; and the second lens group is composed of cemented lens elements;

said second lens group adjoins said erecting prism system from the object-side with an air gap between said second lens group and said prism system, and said second lens group is moved in a direction substantially perpendicular to an optical axis to deviate the image so as to stabilize the image; and wherein the following expressions are satisfied:

$0.25 \leq f_1/f \leq 0.75$;

$0.05 \leq D/f \leq 0.6$;

$0.2 \leq D/f_1 \leq 0.8$, and $-2.2 \leq f_2/f_1 \leq -0.25$, where f is a focal length of the objective lens system, $f_1$ is a focal length of the first lens group, D is a distance between principle points of the first lens group and the second lens group, and $f_2$ is a focal length of the second lens group of the objective lens system.

* * * * *